Oct. 4, 1938.  I. L. CUNNINGHAM  2,131,726
VEHICLE TRAFFIC SIGNAL SWITCH
Filed July 7, 1936   2 Sheets-Sheet 2
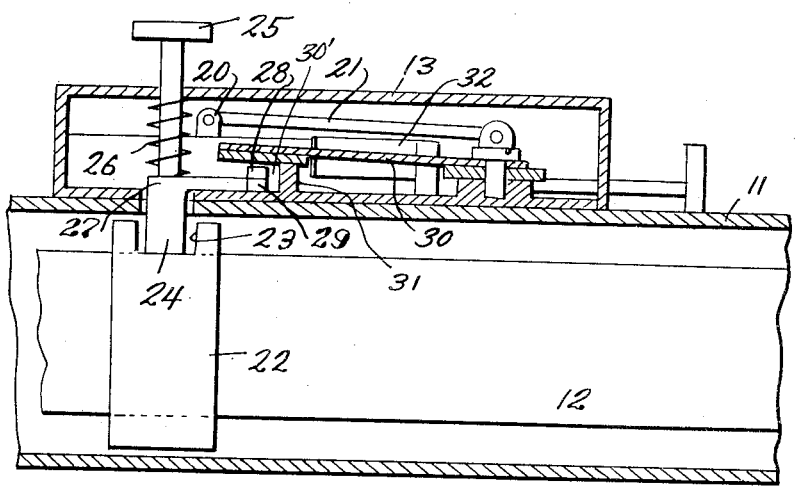
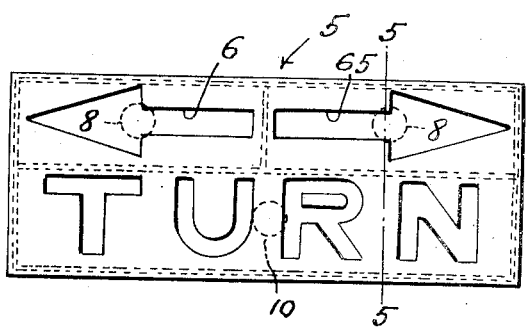
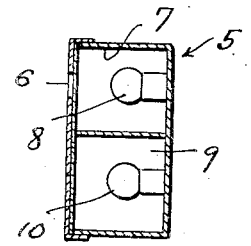
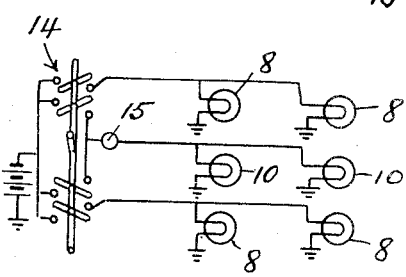
Inventor
Irwin L. Cunningham
By Clarence A. O'Brien and
Hyman Berman
Attorneys Patented Oct. 4, 1938

2,131,726

UNITED STATES PATENT OFFICE 2,131,726

VEHICLE TRAFFIC SIGNAL SWITCH

Irwin L. Cunningham, Dallas, Tex.

Application July 7, 1936, Serial No. 89,357

3 Claims. (Cl. 200—59)

This invention relates to a vehicle traffic signal of the type adapted to be mounted on a vehicle for indicating a change in the direction of travel, towards the right or towards the left; and more particularly the invention consists in the provision of an improved and efficient switch for such type of signal.

An object of the present invention is to provide in a traffic signal of this character, an improved switch structure which may be manually operated for completing a circuit through a signal lamp or lamps, together with mechanism for automatically operating the switch from the steering column for interrupting the circuit after the turn has been begun.

The invention, together with its objects and advantages will be best understood from a study of the following description when taken in connection with the accompanying drawings, wherein:—

Figure 3 is a fragmentary detail sectional view illustrating the mechanism for operating the switch from the steering rod of a vehicle.

Figure 4 is an elevational view of a lamp casing.

Figure 5 is a sectional view taken substantially on the line 5—5 of Figure 4.

Figure 6 is a wiring diagram.

Figure 1:
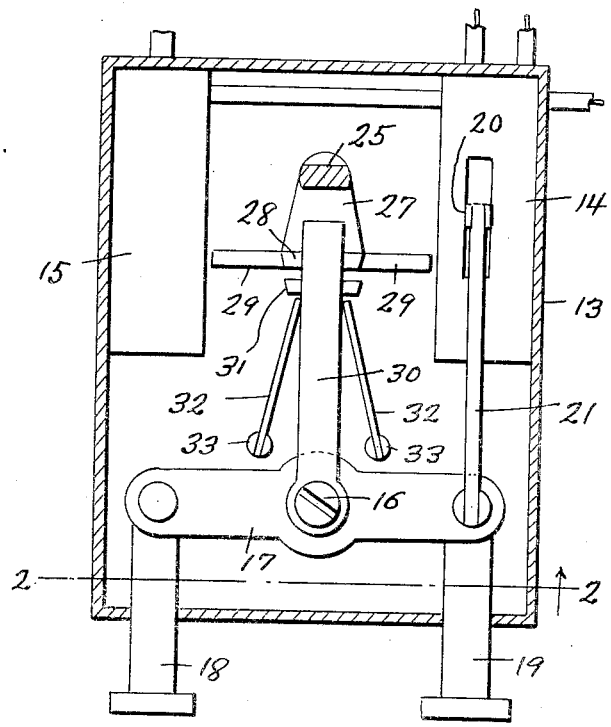
Figure 1 is a view partly in section and partly in elevation illustrating a switch and controlling member therefor.
Figure 2:
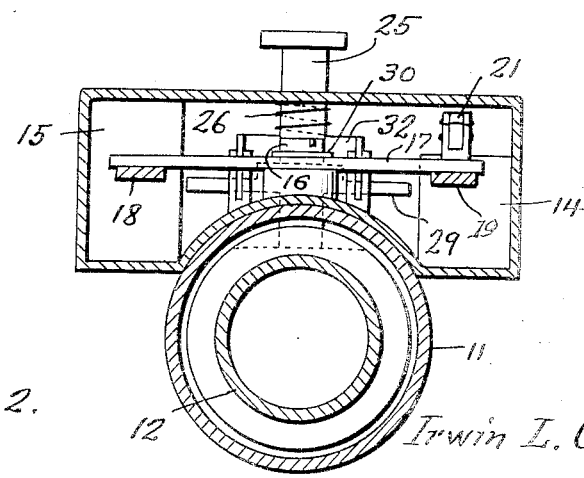
Figure 2 is a sectional view taken substantially on the line 2—2 of Figure 1.

In accordance with the present invention, there is mounted preferably at the front and rear of the vehicle, a suitable lamp casing 5 provided with, in the present instance, arrows 6 for indicating directions and under these arrows the legend: "Turn" as shown in Figure 4. Behind the arrows 6 are compartments 7 in which are arranged electric light bulbs 8. Behind the legend "Turn" is a single compartment 9 in which is mounted an electric light bulb 10.

Further in accordance with the present invention there is suitably mounted on the tubular casing 11, usually provided for the steering member 12 of an automobile, a casing 13 in which is suitably mounted any desired and well known type of double pole, double throw, switch 14, one side of which is arranged in circuit with the lamps 8 in a manner, when the switch is tripped in one direction, to complete the circuit through one lamp 8 in each of the signal boxes 5, and when the switch is tripped in an opposite direction, to complete the circuit in the other lamp 8 in each of the signal boxes.

Also arranged in circuit with the switch 14 and with the lamps 10, is a thermostatic circuit breaker or flasher mechanism 15, all of which will be clear from a consideration of the wiring diagram of Figure 6. Since the wiring system forms no part of the invention, it is thought that a detailed description of the same is unnecessary.

For operating the switch 14, there is pivotally mounted within the casing 13 and at 16, a rocker arm 17, the respective opposite ends of which are pivotally connected to push buttons 18 and 19 respectively.

The push buttons 18 and 19 will have suitable designating indicia thereon, as for example, the push button 18 may have on the knob thereof the letter "L" to indicate that this button is to be used to complete the circuit through the lights for indicating "Left" turn and the push button 19 on the head thereof will have "R" thereon to indicate that this button is to be pushed for operating the switch 14 to complete the circuit through the lamps for indicating "Right" turn.

At one end thereof, and in the present instance, at the end thereof connected with the push button 19, the rocker arm 17 is operatively connected with the trip lever 20 of the switch 14 through the medium of a link 21 as shown in Figure 1.

From the above it will be apparent that when the button 18, for example, is pushed in, the lever 20 of the switch 14 will be caused to rock in one direction for operating the switch 14 to close the circuit through a pair of lamps 8, through the flasher mechanism 15, and through the lamps 10 for indicating "Left turn" and with each of the lamps 10 flashing off and on to attract attention.

By pushing inwardly on the button 19, the lever 20 of the switch 14 will be rocked in the reverse direction for completing the circuit through a second pair of lamps 8, through the flasher mechanism 15 and through the lamps 10 for indicating "Right" turn with the lamps 10 intermittently flashing on and off for attracting attention to the signal.

Further, in accordance with the present invention there is to be mounted on the steering rod 12 to turn therewith, a cam collar 22 provided with a cam groove 23, in which is normally engaged the enlarged inner end of a plunger 25 that works through the casing 13, a suitably provided spring 26 urging the end 24 of the plunger into contact with the cam collar 22 as shown in Figure 3.

Extending laterally from the plunger 25 is an arm 27 provided with a raised portion or lug 28; said arm also having oppositely extending projections 29 at its free end.

A spring latch member 30 is secured to the arm 17 at the pivot 16 of the arm in a manner to rotate with the arm and said spring latch member 30 has a free end normally engaging a keeper lug 31 provided in the casing 13 as shown in Figures 1 and 3. The free end of the spring latch member 30 is provided on the under side thereof with a wear plate 30' as shown in Figure 3.

Normally the latch arm 30 is held in engagement with the top edge of the lug 31 through the medium of spring members 32 disposed at opposite sides of the latch member 30 and anchored at one end as at 33. The springs 32 converge toward their free ends and bear against the sides of the latch member 30 as shown in Figure 1.

From the above it will be apparent that when the push button 18 is pushed in for completing the circuit through the lamp to indicate in the present instance "Left" turn, the arm 17 carries with it the latch member 30, the said latch member swinging in a clockwise direction to move off of the lug 31 and onto the extension 29 at the right of Figure 1, and into engagement with the vertical edge of the lug 31 at the right side of the last mentioned lug for holding the switch 14 in closed position until the turning of the vehicle in the indicated direction is begun.

Manifestly as the steering wheel is turned the steering rod 12 turns therewith so that the inner end 24 of the plunger 25 moves out of the groove 23 onto the ungrooved periphery of the cam 22. As a result of this the plunger 25 is moved upwardly in opposition to the spring 26. As the plunger 25 moves upwardly the latch member 30 is caused to raise upwardly sufficiently far to clear the lug 31, and at this point the latch member 30 is moved slightly inwardly under the action of the spring 32 at the right of Figure 1 so as to engage the adjacent side edge of the lug 28 for holding the switch 14 in closed position until the turning of the vehicle in the direction indicated is well under way.

After the turn has been completed and the rod 12 is turned in a reverse direction for straightening out the front wheels of the vehicle plunger 25 will lower, the lower end of the plunger dropping back into the groove 23 in the cam. Obviously this will result in a lowering of the lug 28 permitting the latch member 30 to drop back onto the top edge of the lug 31 and under the equalizing action of springs 32 return to the position shown in Figure 1. The parts are then in a normal position.

It will be apparent that the operation above described will take place upon a turning of a vehicle either to the right or to the left.

It is thought that a clear understanding of the device and the advantages of an invention of this character will be had without a more detailed description.

What is claimed as new is:—

1. In combination with a steering post, including a casing and a post rotatably mounted within the casing, of a switch casing mounted on the first casing, a double acting switch arranged in the second casing and adapted to be placed in circuit with a vehicular traffic signal device for controlling said device, an arm pivotally mounted within said casing, an operating connection between said arm and said switch for operating the latter, push buttons projecting from said casing and having inner ends pivotally connected with said arm, a stop lug mounted in said casing, a spring latch member secured at one end to said arm at the pivot point of said arm and having a free end engageable with either side of said stop lug for releasably retaining said arm in either of two positions, spring devices mounted at opposite sides of said latch member and having bearing engagement with said latch member for yieldably retaining same in a position with the free end of said latch member resting on the top edge of said lug, and means for raising the free end of said latch member out of engagement with either end edge of the stop lug, and for holding said latch member in a switch-closing position, as and for the purpose specified.

2. In combination with a steering post, including a casing and a post rotatably mounted within the casing, of a switch casing mounted on the first casing, a double acting switch arranged in the second casing and adapted to be placed in circuit with a vehicular traffic signal device for controlling said device, an arm pivotally mounted within said casing, an operating connection between said arm and said switch for operating the latter, push buttons projecting from said casing and having inner ends pivotally connected with said arm, a stop lug mounted in said casing, a spring latch member secured at one end to said arm at the pivot point of said arm and having a free end engageable with either side of said stop lug for releasably retaining said arm in either of two positions, spring devices mounted at opposite sides of said latch member and having bearing engagement with said latch member for yieldably retaining same in a position with the free end of said latch member resting on the top edge of said lug, a plunger member movable through said casings in a plane at right angles to the steering rod, a cam member on said steering rod and turnable therewith, and said plunger having an inner end engaging the periphery of said cam member, and means projecting laterally from said plunger and engageable with the free end of said latch member to raise the latter for clearing said stop lug incidental to a rotation of the steering rod, and for holding the latch member in a position retaining the switch in a closed position, until the turning of the vehicle in the direction indicated is well under way.

3. In combination with a steering post and its housing, a switch casing mounted on the housing, a switch in the casing adapted to be arranged in circuit with a vehicular traffic signal, an arm pivotally mounted in the casing and means operatively connecting the arm with the switch for operating the switch incidental to a swinging movement of the arm, a fixed upstanding lug in the casing, a latch member secured at one end to the arm to turn therewith and having a free end adapted to normally bear on the upper edge of said lug and to engage a side edge of the lug when the arm is turned in one direction for tripping the switch and for holding the switch in closed position, means mounted in the casing and operable in response to a turning movement of the steering rod to raise said end of the latch member up sufficiently far to clear said stop lug and at the same time hold the latch member in a position for retaining the switch in a closed position until the actual turning of the vehicle is under way, and also to hold the latch member in a position to return to a position of rest on the upper edge of the stop lug incidental to a reverse rotation of the steering rod after the vehicle has negotiated the turn.

IRWIN L. CUNNINGHAM.